US011161540B2

(12) United States Patent
Monnet et al.

(10) Patent No.: US 11,161,540 B2
(45) Date of Patent: Nov. 2, 2021

(54) POWER STEERING SYSTEM WITH STEERING COLUMN RETRACTABLE ACCORDING TO AN IMPROVED BACKWARD STROKE BY MEANS OF A THROUGH INDUCTIVE SENSOR

(71) Applicant: JTEKT EUROPE, Irigny (FR)

(72) Inventors: Roch Monnet, Brindas (FR); Laurent Rey, Villeurbanne (FR); Philippe Chauvrat, Villeneuve (FR); Raphaël Vadon, Lyons (FR); Boris Catherin, Décines (FR); Philippe Vercoustre, Saint Genis les Ollieres (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 16/927,076

(22) Filed: Jul. 13, 2020

(65) Prior Publication Data
US 2021/0009187 A1    Jan. 14, 2021

(30) Foreign Application Priority Data

Jul. 12, 2019  (FR) ...................................... 19/07849

(51) Int. Cl.
*B62D 1/185*  (2006.01)
*B62D 3/04*  (2006.01)
(Continued)

(52) U.S. Cl.
CPC .............. *B62D 1/185* (2013.01); *B62D 3/04* (2013.01); *B62D 5/0463* (2013.01); *B62D 15/022* (2013.01)

(58) Field of Classification Search
CPC ...... B62D 6/10; B62D 5/0409; B62D 5/0454; B62D 1/16; B62D 15/0215;
(Continued)

(56) References Cited

U.S. PATENT DOCUMENTS

| 4,967,858 A | * | 11/1990 | Kotake | .................... | B62D 6/10 |
| | | | | | 180/444 |
| 5,020,616 A | * | 6/1991 | Yagi | ........................ | B62D 6/10 |
| | | | | | 180/444 |

(Continued)

FOREIGN PATENT DOCUMENTS

| DE | 102015000928 B3 | 7/2016 |
| EP | 2832626 A1 | 2/2015 |

(Continued)

OTHER PUBLICATIONS

Jul. 12, 2019 Written Opinion on the Patentability of The Invention issued in French Patent Application No. FR1907849.

*Primary Examiner* — Paul N Dickson
*Assistant Examiner* — Caitlin Anne Miller
(74) *Attorney, Agent, or Firm* — Oliff PLC

(57) ABSTRACT

A power steering system for a motor vehicle, having a steering column integrating an upper shaft and an intermediate shaft rotatably linked and movable in translation relative to one another, an upper tube and a lower tube rotatably linked and movable in translation relative to one another, the upper shaft being movable in rotation and linked in translation within the upper tube, and an assist module integrating an output shaft linked in rotation with the intermediate shaft via a torsion bar, a reducer having a worm screw driven by an assist motor and which meshes on a worm wheel linked to the output shaft; and an angle measuring device having an inductive sensor carried by an annular support having a central orifice dimensioned so as to let the upper tube pass, a lower target securely mounted around the output shaft and an upper target.

15 Claims, 4 Drawing Sheets

(51) Int. Cl.
*B62D 5/04* (2006.01)
*B62D 15/02* (2006.01)

(58) Field of Classification Search
CPC .......................... B62D 15/0235; B62D 5/0403;
B62D 51/158; B62D 5/0463; B62D
15/022; G01L 5/221
See application file for complete search history.

(56) References Cited

U.S. PATENT DOCUMENTS

| | | | |
|---|---|---|---|
| 9,296,413 B2* | 3/2016 | Tsukada | ................ B62D 5/0403 |
| 2002/0029923 A1* | 3/2002 | Tanioka | ................... B62D 6/10 |
| | | | 180/444 |
| 2007/0209864 A1* | 9/2007 | Segawa | ................ B62D 5/0403 |
| | | | 180/446 |
| 2021/0009188 A1* | 1/2021 | Catherin | .............. B62D 5/0463 |
| 2021/0124349 A1* | 4/2021 | Koehler | ................. B62D 1/183 |

FOREIGN PATENT DOCUMENTS

| | | | |
|---|---|---|---|
| JP | 2018002100 A | * | 1/2018 |
| KR | 1020170019631 A | | 2/2017 |

* cited by examiner

[Fig. 1]
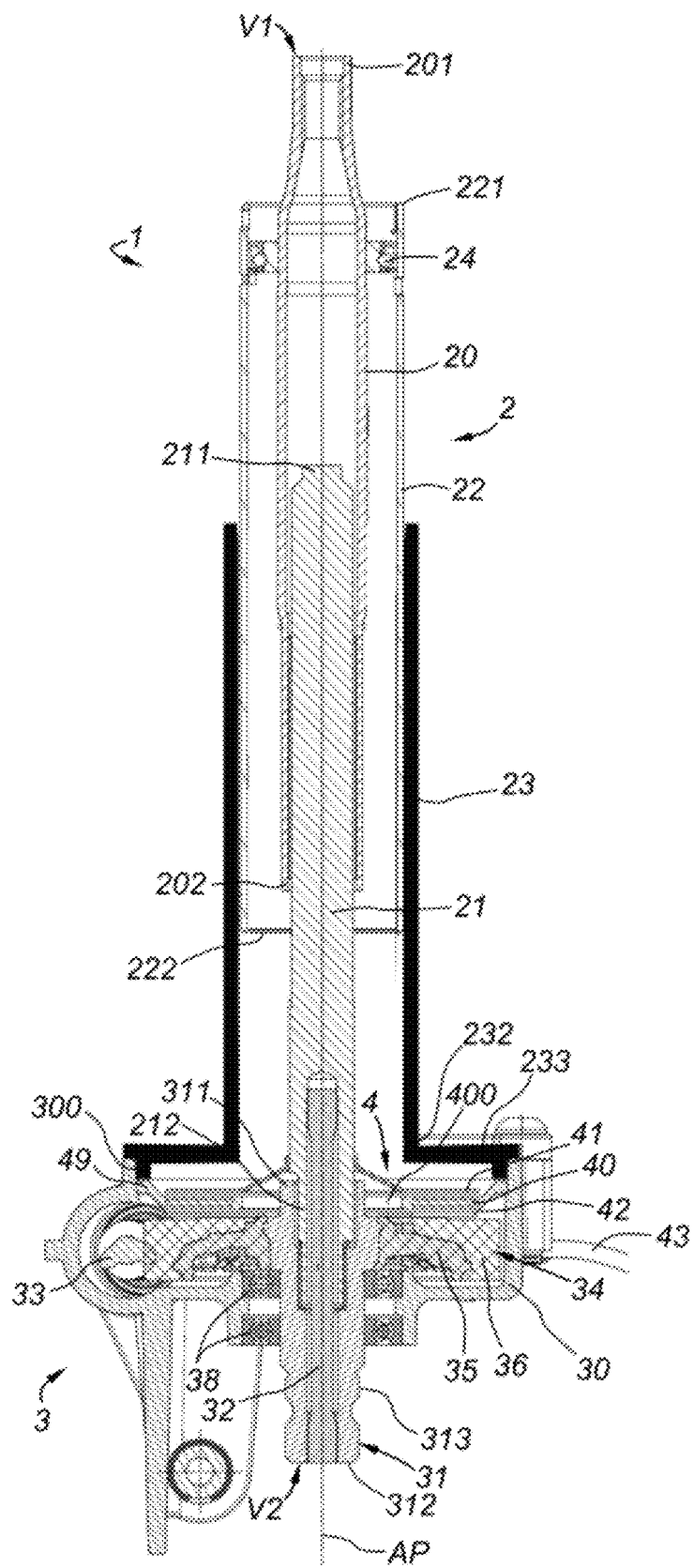

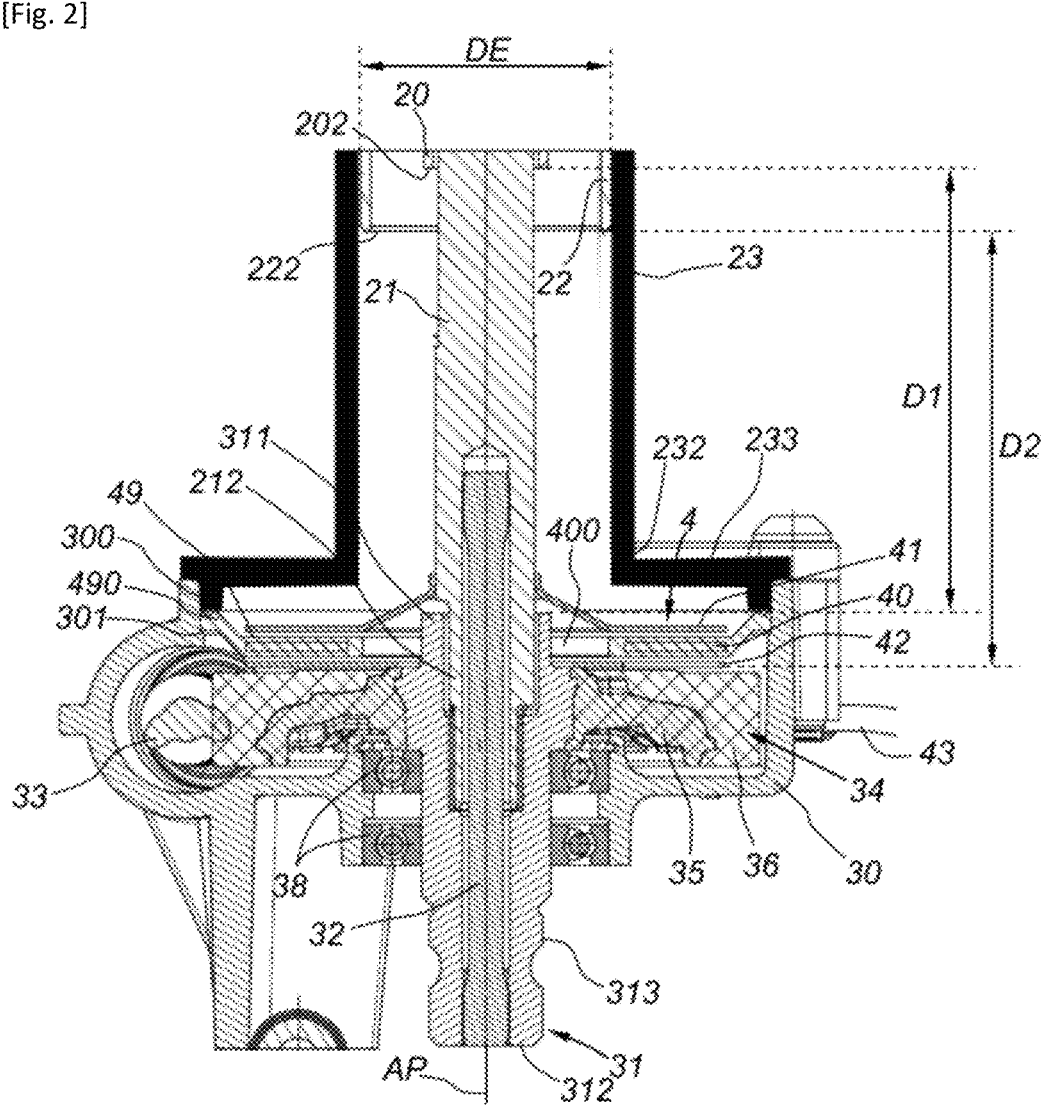
[Fig. 2]

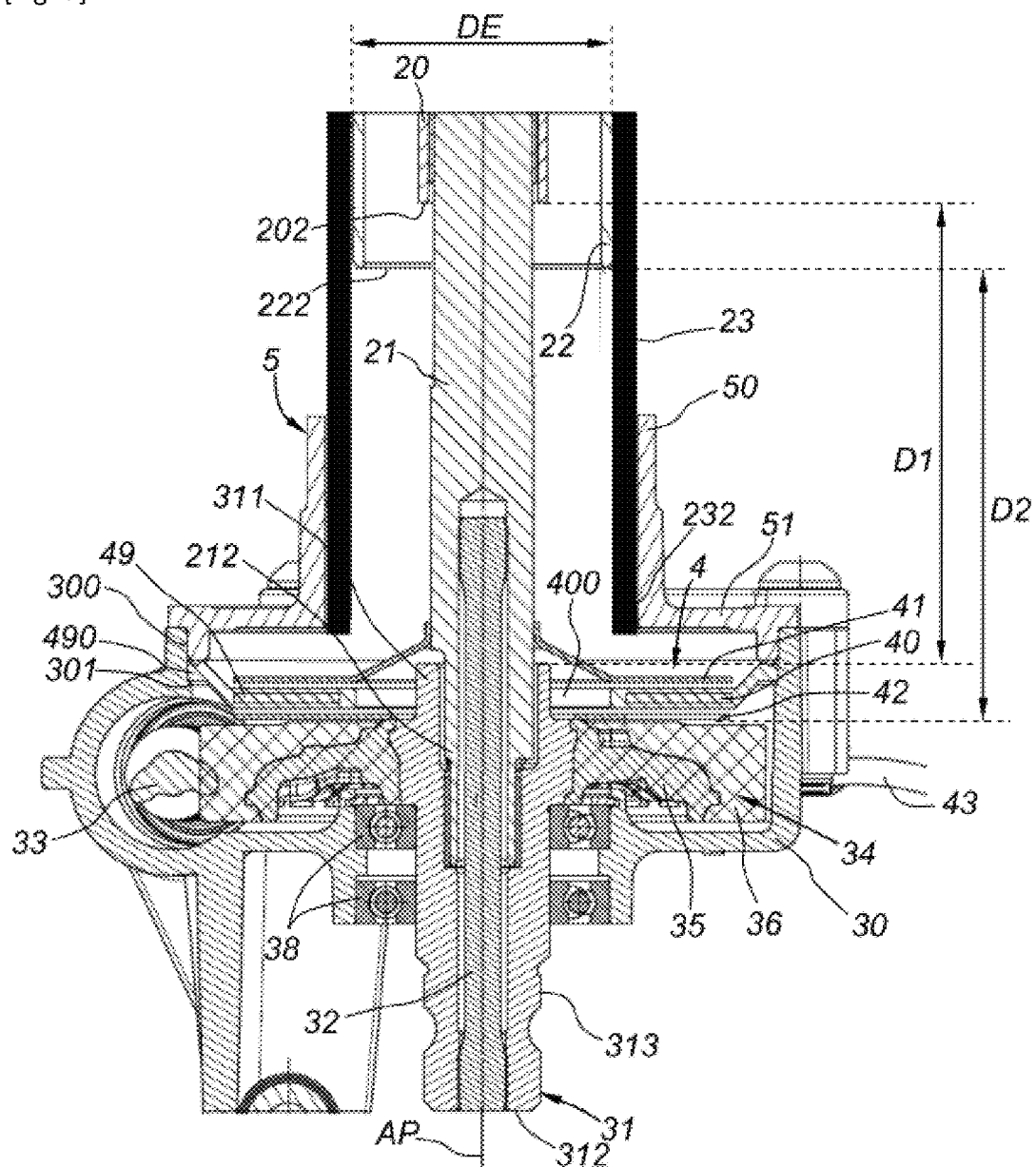
[Fig. 3]

[Fig. 4]
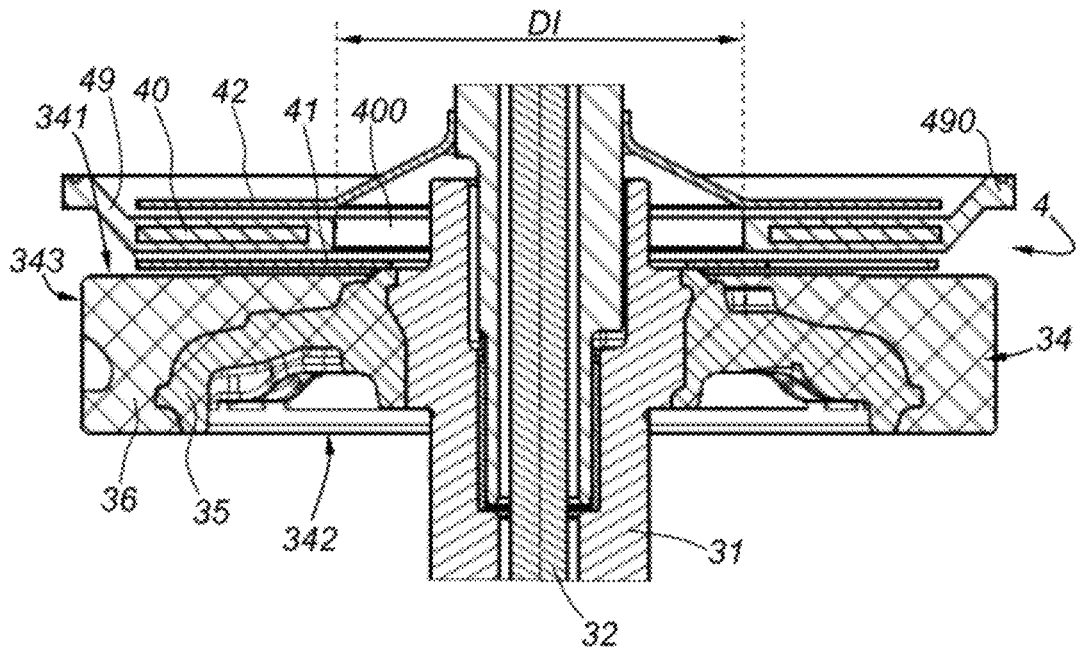
[Fig. 5]
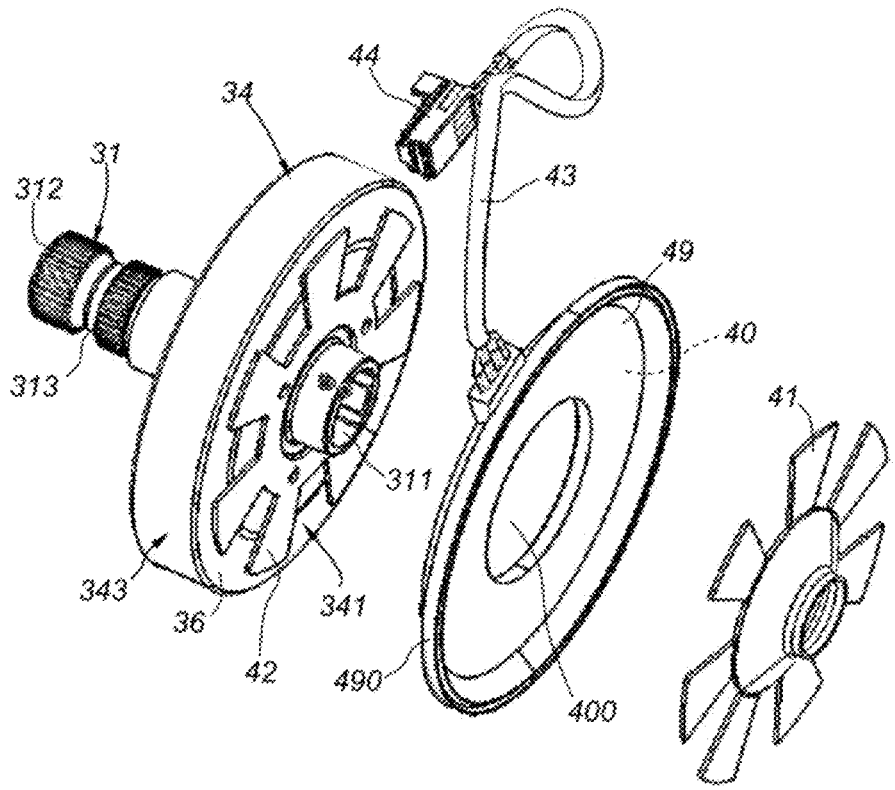

POWER STEERING SYSTEM WITH STEERING COLUMN RETRACTABLE ACCORDING TO AN IMPROVED BACKWARD STROKE BY MEANS OF A THROUGH INDUCTIVE SENSOR

The invention relates to a power steering system for a motor vehicle.

More particularly, it relates to a power steering system comprising a steering column that is retractable in the event of an accident so as to provide an energy absorption function by retraction.

In terms of safety and during a frontal impact of the vehicle, such a retraction actually imparts an axial displacement of the steering wheel with a determined force or absorption level so as to limit or avoid damages to the driver. This axial displacement of the steering wheel is performed over a determined backward stroke (also called crash stroke) which corresponds to the retraction length of the steering column that supports the steering wheel.

Conventionally, such a steering system comprises a steering column integrating:
- an upper shaft and an intermediate shaft coaxial according to a main axis, rotatably linked and movable in translation axially relative to one another; and
- an upper tube and a lower tube coaxial according to the main axis, rotatably linked and movable in translation axially relative to one another, where the upper shaft is mounted movable in rotation inside the upper tube and is axially linked in translation with the upper tube.

This conventional steering system further comprises an assist module integrating a reducer casing on which the lower tube is fastened and integrating, housed at least partially inside the reducer casing:
- an output shaft linked in rotation with the intermediate shaft via a torsion bar;
- a reducer comprising a worm screw driven by an assist motor and which meshes on a worm wheel linked in rotation with the output shaft;
- an angle measuring device adapted to measure a torsion angle between the output shaft and the intermediate shaft, said angle measuring device comprising an inductive sensor and two targets disposed on either side of the inductive sensor according to the main axis, said targets comprising an upper target securely mounted around the intermediate shaft and a lower target securely mounted around the output shaft.

During an accident, the bust of the driver hits the steering wheel carried at an upper end of the upper shaft. Thus, the steering wheel hit by the bust of the driver urges the upper shaft in a backward movement according to the main axis. This upper shaft is linked through a slide connection to the intermediate shaft with respect to which it is fixed, and this upper shaft is linked to the upper tube enabling a rotational guidance thereof. Also, during the accident, the upper tube, in turn, will be urged in a backward movement according to the main axis and will slide relative to the lower tube which, in turn, is fixed. Thus, the upper shaft and the upper tube will be urged together according to the main axis up to an end stop so that the stroke covered up to this end stop constitutes the backward stroke.

Conventionally, the end stop that limits the stroke of the upper tube is located on the lower tube, either on the inner circumference of the lower tube in the case where the upper tube is inside the lower tube, or on the outer circumference of the lower tube in the case where the upper tube is outside the lower tube, or internal or external to the lower tube. It may also be considered to provide an end stop on the intermediate shaft to limit the stroke of the upper shaft.

Hence, the backward stroke is ensured by a telescopic movement of the steering column. Conventionally, the initial length of the steering system, measured according to the main axis, is characterized by the distance according to the main axis between the upper end of the upper shaft (hereinafter the point V1) and the lower end of the output shaft (hereinafter the point V2). During an accident, the point V1 gets close to the point V2, the upper shaft moving back (as explained hereinabove) and the point V2 being fixed (the output shaft being fixed in translation within the reducer casing and coupled to the steering rack). Thus, the point V1 gets close to the point V2 by a length which corresponds to the backward stroke. The different elements of the steering column which follow one another between the point V1 and the point V2 allow for a substantially large backward stroke.

Starting from the point V2 lies the reducer which has an uncompressible length, then the angle measuring device which also has an uncompressible length, then finally up to the point V1 the assembly constituted by the intermediate shaft linked to the upper shaft and by the lower tube linked to the upper tube, where the upper shaft and the intermediate shaft are movable in translation axially relative to one another and similarly the upper tube and the lower tube are movable in translation axially relative to one another.

Thus, only one portion of the steering column is sliding or telescopic so as to cover the backward stroke. However, the upper shaft and the intermediate shaft, and similarly the upper tube and the lower tube, do not slide over the entirety of their respective lengths in order to ensure some rigidity of the steering column. The overlapping lengths between the upper shaft and the intermediate shaft, and between the upper tube and the lower tube, depend on their respective diameters, but are conventionally in the range of 40 to 60 millimeters.

As regards the angle measuring device, the latter incorporates the inductive sensor disposed between two targets made of an electrically-conductive material, in general a metallic material, which are placed one on the output shaft, the other on the intermediate shaft and which enable the inductive sensor to measure the relative angle between the two targets and therefore between the intermediate shaft and the output shaft. By measuring this angle, it is then possible to calculate the torque exerted by the driver on the steering wheel as the product of the stiffness of the torsion bar and the measured angle. An induced current is created between the targets and the inductive sensor, located between the two targets, allows measuring the angle through a known principle.

An object of the invention is to increase the backward stroke, in order to improve the safety of the driver through an increased backward movement of the steering wheel during an accident which makes the driver hit the steering wheel.

Another object of the invention is to provide a technical solution that increases the backward stroke without altering the operation of the steering system.

To this end, the invention provides a power steering system for a motor vehicle, comprising a steering column configurable between a use configuration and a retracted configuration, this steering column integrating:
- an upper shaft and an intermediate shaft coaxial according to a main axis, rotatably linked and movable in translation axially relative to one another; and
- an upper tube and a lower tube coaxial according to the main axis, rotatably linked and movable in translation axially relative to one another, where the upper shaft is mounted movable in rotation inside the upper tube and is axially linked in translation with the upper tube, and where the upper tube is mounted inside the lower tube;

this power steering system further comprising an assist module integrating a reducer casing on which the lower tube is fastened and integrating, housed at least partially inside the reducer casing:

an output shaft linked in rotation with the intermediate shaft via a torsion bar;

a reducer comprising a worm screw driven by an assist motor and which meshes on a worm wheel linked in rotation with the output shaft;

an angle measuring device adapted to measure a torsion angle between the output shaft and the intermediate shaft, said angle measuring device comprising an inductive sensor and two targets disposed on either side of the inductive sensor according to the main axis, said targets comprising an upper target securely mounted around the intermediate shaft and a lower target securely mounted around the output shaft;

this power steering system being remarkable in that the inductive sensor is mounted on a fixed annular support, made of an electrically-insulating material and extending inside the reducer casing around the intermediate shaft or the output shaft, where this annular support is mounted on the reducer casing, and this annular support has a central orifice crossed by the intermediate shaft or the output shaft and dimensioned so as to let the upper tube pass during the switch from the use configuration into the retracted configuration, the lower tube being internally deprived of an end stop adapted to stop the upper tube during the switch from the use configuration into the retracted configuration.

Thus, during an accident, the steering column switches from the use configuration into the retracted configuration, with the upper shaft and the upper tube which will be urged together in an axial backward movement (or retraction movement) according to the main axis. During this axial backward movement, the upper tube will move back in the direction of the worm wheel, through the inductive sensor and its annular support (which is possible thanks to the dimensions of its central orifice).

Thus, the upper tube may reach, or at least almost reach the worm wheel, thereby allowing for an increase in the backward stroke of the steering column.

It should be noted that, during this backward axial movement, before passing through the inductive sensor and its annular support, the upper tube has also to pass through the upper target, which is not a problem to the extent that the axial force exerted by the upper tube on this upper target during an accident is high enough (in general in the range of 100 to 800 Newtons) for the upper target not preventing the backward movement of the upper tube.

According to one possibility, the upper tube has a lower end located at a second distance from the worm wheel, and an end stop is provided to stop the upper shaft in the retracted configuration, said end stop being located at a first distance from a lower end of the upper shaft measured along the main axis in the use configuration, where the first distance and the second distance are equivalent within a 10% margin, the largest one amongst the first distance and the second distance corresponding to a backward stroke of the steering column.

Thus, during the axial backward movement, the upper shaft will move back in the direction of the end stop by a distance substantially equivalent to the first distance, and the upper tube will move back in the direction of the worm wheel by a distance substantially equivalent to the second distance. Thus, the upper tube may reach, or at least almost reach (depending on whether the first distance is smaller or larger than the second distance) the worm wheel.

In a particular embodiment, the end stop for the upper shaft is provided on the intermediate shaft or on the output shaft.

According to a feature of the invention, the end stop for the upper shaft is formed by an upper end of the output shaft, or alternatively the end stop is provided on the intermediate shaft, and is for example in the form of an outer shoulder formed on an outer periphery of the intermediate shaft.

Of course, the invention shall not be limited to this arrangement of the end stop for the upper shaft on the intermediate shaft or on the output shaft.

According to one possibility, the upper tube has a circular section with an external diameter, and the central orifice has a circular shape with an internal diameter which is larger than the external diameter of the upper tube.

In an advantageous embodiment, the upper target has one or several break-off primer(s), so as to initiate a breakage of the upper target when the upper tube moves back against the latter and thus let the upper tube pass through the inductive sensor and its annular support.

According to one feature, the break-off primer(s) are formed by holes crossing the upper target.

The annular support is made of an electrically-insulating material which is for example a plastic material, such as a reinforced plastic material (polyamide or polybutylene terephthalate or polyphenylene sulfone or other technical thermoplastics or an epoxy, polyurethane thermosetting material . . . , reinforced with glass, carbon, aramid fibers or a combination of these fibers).

According to one possibility, the annular support has an outer ring disposed around the inductive sensor and mounted on the reducer casing.

Thus, the annular support is carried by the reducer casing, and this annular support may be blocked in rotation using shapes around the connection cable which connects the inductive sensor to a controller and to a power supply.

According to another possibility, the outer ring of the annular support is mounted directly on the reducer casing, or is mounted on a subplate secured to the lower tube and fastened on the reducer casing, or is mounted on a tray of a fastening sleeve fastened on the reducer casing, said fastening sleeve comprising a bushing secured to the tray and inside which the lower tube is fastened.

Indeed, this outer ring may be mounted directly on the reducer casing, within a journal extending around the intermediate shaft or the output shaft, or alternatively this outer ring may be mounted on a subplate of the lower tube which fits within the aforementioned journal (this subplate of the lower tube being fastened on the reducer casing), or alternatively this outer ring may be mounted on the tray of the fastening sleeve which fits within the aforementioned journal (the lower tube being fastened to the bushing of this fastening sleeve).

According to another possibility, the inductive sensor is overmolded inside the annular support or assembled on the annular support.

In a first embodiment, the worm wheel comprises a core made of a plastic material around the output shaft, and the lower target is secured to an upper lateral face of said core.

For a proper operation of the angle measuring device with an inductive sensor, it is necessary to electrically insulate the targets from any considerable metallic weight that might disturb the currents induced between each target and the inductive sensor. Conventionally, with a metallic worm wheel, it is essential to establish a minimum distance (according to the main axis) between the lower target (that one on the worm wheel side) and the worm wheel, in general between 5 and 20 millimeters to avoid the worm wheel disturbing the currents induced between the lower target and the inductive sensor.

By proposing pressing the lower target on or integrating the lower target to the upper lateral face of a plastic core of the worm wheel, this first embodiment allows gaining the aforementioned minimum distance between 5 and 20 millimeters on the backward stroke, bearing in mind that this plastic core, which is necessarily electrically-insulating, allows not disturbing the currents induced between the lower target and the inductive sensor. It is further indicated that the worm wheel is linked in rotation with the output shaft so that the lower target rotates with the output shaft, and therefore this lower target properly fills its function of marking the rotation of the output shaft in the context of the angle measuring device.

The lower target is secured to the upper lateral face of the core by gluing, or by welding (necessarily without the use of any metallic material), or by clipping, or by snap-crimping, or by overmolding, or by screwing.

Alternatively, the lower target is secured to the upper lateral face of the core by a metal deposition over the upper lateral face.

For example, this metallic deposition forming the lower target is made by a hot-marking with a metallic film borne by a support film, or by a selective metallization of the upper lateral face of the core.

A hot-marking consists in applying over the upper lateral face a metallic film borne by a support film by means of a heating tool comprising in relief the pattern of the lower target, this heating tool serving to apply a pressure on the metallic film placed over the upper lateral face. On contact with the temperature of the heating tool and the exerted pressure, the metallic film is transferred to the upper lateral face so as to form the lower target. The advantages of such a hot-marking consist of a reduced cost and a high accuracy.

A selective metallization consisting in affixing a mask over the upper lateral face, and applying a metallic deposition, generally under vacuum and for example by spraying or projection, whose contours will be defined by the mask.

According to one variant, the lower target has a thickness comprised between 100 and 300 micrometers.

According to one variant, the lower target is made of a metallic material such as for example aluminum, steel, copper, iron, or an alloy of metals.

According to one feature, the core comprises a rim made of a plastic material and a toothed crown made of a plastic material overmolded around the rim, and the lower target is secured to the rim and/or to the crown.

The formation of such a core made of a plastic material with a rim and a toothed crown is known for example from the documents EP2952321, EP3155296 and EP3134246, all of them concerning an overmolding method consisting in overmolding with a first plastic material a corolla-shaped rim over the output shaft, then wrapping this rim with a second plastic material, forming a crown at the periphery of which are then formed teeth that are intended to mesh with the worm screw of the reducer.

For example, the plastic material(s) used for the core are of the polyamide, poly(butyl terephthalate) or polypropylene type reinforced with glass, carbon or aramid fibers or a combination thereof.

In a second embodiment, the lower target is located at a non-zero minimum distance from the worm wheel measured along the main axis in the use configuration.

This second embodiment may be considered in the particular case of a metallic worm wheel, so that the latter does not electrically disturb the lower target.

Thus, in this second embodiment, once the upper tube has crossed the inductive sensor, it is free to reach the lower target and preferably cross this lower target so as to reach the worm wheel.

Advantageously, in this second embodiment, the lower target has one or several break-off primer(s), so as to initiate a breakage of the lower target when the upper tube moves back against the latter and thus let the upper tube pass in the direction of the worm wheel.

Other features and advantages of the present invention will appear on reading the detailed description hereinafter, of a non-limiting example of implementation, made with reference to the appended figures in which:

FIG. 1 is a schematic axial sectional view of a first steering system according to the invention;

FIG. 2 is a schematic view zoomed on a portion of the first steering system of FIG. 1, centered on the angle measuring device;

FIG. 3 is a schematic view, equivalent to that of FIG. 2, zoomed on a portion of a second steering system according to the invention, centered on the angle measuring device;

FIG. 4 is a schematic view of the worm wheel and angle measuring device assembly, mounted around the output shaft and the intermediate shaft, of the first steering system of FIGS. 1 and 2 or of the second steering system of FIG. 3;

FIG. 5 is a schematic perspective and exploded view of the worm wheel and angle measuring device assembly, with the worm wheel integrated by overmolding to the output shaft.

Referring to FIG. 1, a power steering system 1 according to the invention comprises a steering column 2 coupled to an assist module 3.

The steering column 2 is of the telescopic or retractable type, and as such, it is configurable between a use configuration and a retracted configuration (during an accident).

This steering column 2 comprises:
- an upper shaft 20 and an intermediate shaft 21 coaxial according to a main axis AP, where the upper shaft 20 and the intermediate shaft 21 are rotatably linked and are movable in translation axially (according to the main axis AP) relative to one another; and
- an upper tube 22 and a lower tube 23 coaxial according to the main axis AP, where the upper tube 22 and the lower tube 23 are rotatably linked and movable in translation axially (according to the main axis AP) relative to one another, and where the upper shaft 20 is mounted movable in rotation inside the upper tube 22 and is axially linked in translation with the upper tube 22.

The upper tube 22 and the upper shaft 20 form the top portion of the steering column 2, with the upper shaft 20 which has an upper end 201 (forming the aforementioned point V1) on which a steering wheel (not illustrated) is mounted. A bearing 24 is provided between the upper tube 22 and the upper shaft 20, at the level of an upper end 221 of the upper tube 22, to guide the rotation of the upper shaft 20 inside the upper tube 22. This upper tube 22 also has a lower end 222 opposite to the upper end 221.

The lower tube 23 and the intermediate shaft 21 form the bottom portion of the steering column 2, with the lower tube 23 which has a lower end 232 fastened on the assist module 3, and more particularly on a reducer casing 30.

In the embodiment of FIGS. 1 and 2, the lower tube 23 has its lower end 232 which is secured to a subplate 233 fastened on the assist module 3 (and more specifically on the reducer casing 30 described hereinafter) for example by screwing, this subplate 233 being fitted into a cylindrical upper journal 300 of the reducer casing 30 extending around the intermediate shaft 21, and this subplate 233 is provided with a central hole crossed by the intermediate shaft 21.

In the variant of FIG. 3, the lower tube 23 is secured to a fastening sleeve 5 comprising:
- a bushing 50 (with a cylindrical general shape) on which the lower tube 23 is fastened, the lower tube 23 being press-fitted inside this bushing 50, and
- a tray 51 secured to the bushing 50, this tray 51 being fastened on the reducer casing 30, for example by screwing, this tray 51 being fitted into a cylindrical upper journal 300 of the reducer casing 30 extending around the intermediate shaft 21, and this tray 51 is provided with a central hole crossed by the intermediate shaft 21.

The upper shaft 20 has a lower end 202 linked through a slide connection according to the main axis AP to an upper end 211 of the intermediate shaft 21 with respect to which it is fixed. The upper tube 22 is linked through a slide connection according to the main axis AP to the lower tube 23 with respect to which it is fixed, with the upper tube 22 which is mounted inside the lower tube 23 (and in this case, the upper tube 22 is internal to the lower tube 23).

In addition, the lower tube 23 is internally deprived of an end stop adapted to stop the upper tube 22 during the switch from the use configuration into the retracted configuration, in other words during its backward movement.

In the illustrated examples, between the lower end 222 of the upper tube 22 and the lower end 232 of the lower tube 23, the lower tube 23 has a constant inner section, that is to say with a constant diameter, without any inner projection, so that the lower end 222 of the upper tube 22 could (in case of retraction) slide inside the lower tube 23 until reaching the inside of the reducer casing 30 described hereinafter.

The assist motor 3 comprises the reducer casing 30 on which the lower tube 23 (and more specifically the subplate 233 secured to the lower tube 23) is fastened and this assist module 3 comprises, housed at least partially inside the reducer casing 30:
- an output shaft 31 (also called pinion) linked in rotation with the intermediate shaft 21 via a torsion bar 32;
- a reducer comprising a worm screw 33 driven by an assist motor (not illustrated) and which meshes on a worm wheel 34 linked in rotation with the output shaft 31;
- an angle measuring device 4 adapted to measure a torsion angle between the output shaft 31 and the intermediate shaft 21.

The output shaft 31 has an upper end 311 linked in rotation with a lower end 212 of the intermediate shaft 21 via the torsion bar 32. The output shaft 31 has a lower end 312 (forming the aforementioned point V2) and at the level of which is provided a pinion 313 engaged with a steering rack (not illustrated); such a steering rack being provided with two ends intended to be coupled to respective steering tie rods, connected, in turn, to wheel-side ball-joint cases associated respectively to the right and left steered wheels of the motor vehicle.

Thus, an additional motor torque (or possibly a resistant torque) may be transmitted to the output shaft 31, and therefore to the pinion 313 engaged with the steering rack, this additional torque adding to the torque manually exerted by the driver of the motor vehicle, on the steering wheel linked to the steering column 2.

The output shaft 31 is rotatably mounted about the main axis AP inside the reducer casing 30 by means of at least one bearing 38 carried by the reducer casing 30.

In the event of an accident, the upper shaft 20 moves back by sliding along the intermediate shaft until reaching an end stop located at a first distance D1 from the lower end 202 of the upper shaft 20 measured along the main axis AP in the use configuration; this end stop ensuring a stoppage of the upper shaft 20 in the retracted configuration, in other words during its backward movement in the event of an accident. Thus, in the event of a backward movement, the upper shaft 20 moves back at most by this first distance D1 by sliding along the intermediate shaft 21.

In the illustrated examples, this end stop is formed by the upper end 311 of the output shaft 31. Indeed, the intermediate shaft 21 has its end which is mounted inside the output shaft 31, and by the upper end 311 of the output shaft 31 therefore surrounds the output shaft 31.

In a non-illustrated variant, this end stop is provided on the intermediate shaft 21 and is for example in the form of an outer shoulder formed on the outer periphery of the intermediate shaft 21.

The worm wheel 34 comprises a core made of a plastic material around the output shaft 31, the worm wheel 34 then being integrated to the output shaft 31 by overmolding of at least one plastic material of the core over this output shaft 31.

This core made of a plastic material is composed by a rim 35 made of a first plastic material and forming a corolla over and around the output shaft 31, and by a toothed crown 36 made of a second plastic material at the periphery of the rim 35; where this toothed crown 36 forms the outer portion of the core of the worm wheel 34 which is meshing with the worm screw 33.

This core made of a plastic material may be made according to overmolding methods described for example in the documents EP2952321, EP3155296 and EP3134246, to which those skilled in the art shall helpfully refer for further details.

This core made of a plastic material of the worm wheel 34 has two lateral faces 341, 342 opposite one another and connected by an outer periphery 343 in which teeth are formed, these lateral faces 341, 342 comprising:
- an upper lateral face 341 directed towards the upper shaft 20 and therefore also towards the angle measuring device 4; and
- a lower lateral face 342 directed towards the pinion 313.

The angle measuring device 4 is housed at least partially inside the reducer casing 30 and it extends around the intermediate shaft 21 or the output shaft 31, at least around a lower portion of the intermediate shaft 21 or around an upper portion of the output shaft 31 which is housed inside the reducer casing 30. The angle measuring device 4 is interposed between the worm wheel 34 and the lower tube 23, and more specifically between the worm wheel 34 and the subplate 233 of the lower tube 23.

This angle measuring device 4 comprises an inductive sensor 40 and two targets 41, 42 disposed on either side of the inductive sensor 40 according to the main axis AP. These targets 41, 42 comprise:
- an upper target 41 securely mounted around the intermediate shaft 21, so that this upper target 41 is located on the side of the upper shaft 20 opposite the inductive sensor 40;

a lower target 42 securely mounted around the output shaft 31, so that this upper target 41 is located on the side of the worm wheel 34 and the pinion 313 opposite the inductive sensor 40.

These targets 41, 42 are linked in rotation respectively with the intermediate shaft 21 and with the output shaft 31, and these targets 41, 42 are made of an electrically-conductive material, in general a metallic material, so that the inductive sensor 40 allows measuring the relative angle between the two targets 41, 42 and therefore between the intermediate shaft 21 and the output shaft 31; an induced current being created between the targets 41, 42 and the inductive sensor 40 to perform a measurement of the angle.

Thus, the inductive sensor 40 is connected to a connection cable 43, so as to connect the inductive sensor 40 to a control unit (such as for example a controller or processor) and to an electric power supply, by means of a suitable connector 44.

For example, these targets 41, 42 may be made of a steel sheet metal with a thickness comprised between 0.5 and 5 millimeters. Referring to FIG. 4, these targets 41, 42 are for example in the form of disks provided at the outer periphery thereof with a plurality of toothed sectors.

Thus, this angle measuring device 4 allows measuring the relative angle between the intermediate shaft 21 and the output shaft 31, and this measurement may be input in a control unit that could calculate the torque exerted by the driver on the steering wheel as the product of the stiffness of the torsion bar and of the measured angle; this torque then being used to pilot the assist motor.

According to the invention, the inductive sensor 40 is mounted on a fixed annular support 49, made of an electrically-insulating material (for example plastic) and extending inside the reducer casing 30 around the intermediate shaft 21 or the output shaft 31.

In the illustrated example, the inductive sensor 40 is overmolded inside the annular support 49, and in a non-illustrated variant this inductive sensor 40 is assembled on the annular support 49.

This annular support 49 has an outer ring 490 disposed around the inductive sensor 40 and mounted within the upper journal 300 of the reducer casing 30.

In the illustrated example, the outer ring 490 is mounted directly within the upper journal 300 of the reducer casing 30, by press-fitting, and this outer ring 490 is axially blocked on one side by an inner shoulder 301 (referenced in FIG. 2) formed in the reducer casing 30 next to the upper journal 300, and on the other side by the subplate 233.

In a non-illustrated variant, the outer ring 490 is mounted on the subplate 233 of the lower tube 23.

This annular support 49 is crossed by the intermediate shaft 21 or the output shaft 31, and as such, it has a central orifice 400 centered on the main axis AP and dimensioned so as to let the upper tube 22 pass during the switch from the use configuration into the retracted configuration, in other words during its backward movement.

More specifically, the upper tube 22 has a circular section with an external diameter DE (illustrated in FIGS. 2 and 3), and the central orifice 400 has a circular shape with an internal diameter DI (illustrated in FIG. 4) which is larger than the external diameter DE of the upper tube 22.

Thus, the inductive sensor 40 and the annular support 49 are made open-through so that the thickness of the inductive sensor 40/annular support 49 assembly is available for the backward stroke of the upper tube 22 and so that the end stop of the upper tube 22 is substantially the worm wheel 34.

In turn, the upper target 41 is fastened to the intermediate shaft 21 and will therefore interfere with the upper tube 22 during its backward movement. Also, the upper target 41 is advantageously shaped so as to be meltable or frangible beyond a threshold axial force applied by the upper tube 22 and which for example amounts to 100 Newtons.

In order to promote the breakage of the upper target 41, this upper target 41 has one or several break-off primer(s), such as deployable or tearable shapes integrated to the upper target 41. As a non-limiting example, the or each break-off primer may be in the form of a frangible line, a thinned line, or a line of holes crossing the upper target 41.

Complementarily, the upper target 41 may be secured to the intermediate shaft 21 by crimping or press-fitting or gluing or welding. Regardless of the fastening method, the latter may be dimensioned so as to break up on contact with the upper tube 22.

For example, press-fitting of the upper target 41 on the intermediate shaft 21 will allow obtaining by tightening a resistance to slipping from 5 to 50 Newtons depending on the thickness of the upper target 41 when the upper tube 22 would exert an axial force from 100 to 800 N during an accident so that the upper target 41 will not prevent the backward movement of the upper tube 22.

It should be noted that the inductive sensor 40 and the targets 41, 42 generally have circular shapes suited to the detection of a relative angle between the two targets 41, 42.

The inductive sensor 40 embeds a printed circuit which is in particular overmolded or assembled within one or several plastic part(s) forming the annular support 49 so as to be fastened from outside on the reducer casing 30 or on the lower tube 23. This overmolding or these plastic parts will incorporate all or part of the printed circuit of the inductive sensor 40 so as to protect it from pollutions in particular grease that surrounds the worm wheel 34.

Advantageously, the lower target 42 is secured to the upper lateral face 341 of the core made of a plastic material of the worm wheel 34. This lower target 42 is secured to the rim 35 and/or to the crown 36, depending on the dimensions of the rim 35 and of the crown 36 on the upper lateral face 341 and depending on the dimensions (inner diameter and outer diameter) of the lower target 42.

In the illustrated embodiment, the lower target 42 is secured only to the rim 35, whereas in a non-illustrated variant, the lower target 42 may be secured to both the rim 35 and the crown 36, in other words this lower target 42 extends astride the rim 35 and the crown 36.

The lower target 42 may be fastened directly on the worm wheel 34 by gluing, clipping, welding, snap-crimping, screwing or overmolding or any other method allowing securely linking without any clearance between the lower target 42 and the worm wheel 34, such as for example a hot-marking over the upper lateral face 341 of the core with a metallic film borne by a support film, or a selective metallization of the upper lateral face 341 of the core.

By resorting to a worm wheel 34 with a core made of a plastic material and in particular including a rim 35 and a crown 36 made of a plastic material, the electric interactions and disturbances between the lower target 42 and the worm wheel 34 are suppressed and thus the lower target 42 is fastened on the worm wheel 34, which allows suppressing any distance between the lower target 42 and the worm wheel 34, which results in a gain for the backward stroke of the upper shaft 20 and of the upper tube 22 in the event of an accident.

The lower target 42 has a shape complementary with the inductive sensor 40 in particular by featuring an internal diameter equivalent to that of the inductive sensor 40, so as to ensure an optimum operation of the inductive sensor 40.

Fastened axially to the worm wheel 34, this lower target 42 will not interfere with the upper tube 22 during its backward movement.

As shown in FIGS. 2 and 3, the lower end 222 of the upper tube 22 is located at a second distance D2 from the worm wheel 34, and the first distance D1 and the second distance D2 are equivalent within a 10% margin. In other words, D1=D2±0.1*D2, or D2=D1±0.1*D1.

Thus, the largest one amongst the first distance D1 and the second distance D2 corresponding to a backward stroke of the steering column 2.

Also, during an accident, the bust of the driver hits the steering wheel, urging both the upper shaft 20 in a backward movement according to the main axis AP by sliding over the intermediate shaft 21, and the upper tube 22 in a backward movement according to the main axis AP by sliding within the lower tube 23; the upper shaft 20 and the upper tube 22 being urged together according to the main axis AP over a maximum distance corresponding to the backward stroke. During this backward movement, the upper tube 22 breaks the upper target 41, passes through the central orifice 400 of the inductive sensor 40 and substantially reaches the worm wheel 34, and even stops against the worm wheel if D2 is larger than or equal to D1, which results in a gain of the backward movement of the steering column 2.

The invention claimed is:

1. A power steering system for a motor vehicle, comprising a steering column configurable between a use configuration and a retracted configuration, said steering column integrating:
    an upper shaft and an intermediate shaft coaxial according to a main axis, rotatably linked and movable in translation axially relative to one another; and
    an upper tube and a lower tube coaxial according to the main axis, rotatably linked and movable in translation axially relative to one another, where the upper shaft is mounted movable in rotation inside the upper tube and is axially linked in translation with the upper tube, and where the upper tube is mounted inside the lower tube;
    said power steering system further comprising an assist module integrating a reducer casing on which the lower tube is fastened and integrating, housed at least partially inside the reducer casing:
    an output shaft linked in rotation with the intermediate shaft via a torsion bar;
    a reducer comprising a worm screw driven by an assist motor and which meshes on a worm wheel linked in rotation with the output shaft;
    an angle measuring device adapted to measure a torsion angle between the output shaft and the intermediate shaft, said angle measuring device comprising an inductive sensor and two targets disposed on either side of the inductive sensor according to the main axis, said targets comprising an upper target securely mounted around the intermediate shaft and a lower target securely mounted around the output shaft;
    in said power steering system being characterized in that the inductive sensor is mounted on a fixed annular support, made of an electrically-insulating material and extending inside the reducer casing around the intermediate shaft or the output shaft, where the annular support is mounted on the reducer casing, and the annular support has a central orifice crossed by the intermediate shaft or the output shaft and dimensioned so as to let the upper tube pass during the switch from the use configuration into the retracted configuration, the lower tube being internally deprived of an end stop adapted to stop the upper tube during the switch from the use configuration into the retracted configuration.

2. The power steering system according to claim 1, wherein the upper tube has a lower end located at a second distance from the worm wheel, and wherein an end stop is provided to stop the upper shaft in the retracted configuration, said end being located at a first distance from a lower end of the upper shaft measured along the main axis in the use configuration, where the first distance and the second distance are equivalent within a 10% margin, the largest one amongst the first distance and the second distance corresponding to a backward stroke of the steering column.

3. The power steering system according to claim 2, wherein the end stop for the upper shaft is provided on the intermediate shaft or on the output shaft.

4. The power steering system according to claim 3, wherein the end stop for the upper shaft is formed by an upper end of the output shaft, or the end stop is provided on the intermediate shaft in the form of an outer shoulder formed on an outer periphery of the intermediate shaft.

5. The power steering system according to claim 1, wherein the upper tube has a circular section with an external diameter, and the central orifice has a circular shape with an internal diameter which is larger than the external diameter of the upper tube.

6. The power steering system according to claim 1, wherein the upper target has one or several break-off primer(s).

7. The power steering system according to claim 6, wherein the break-off primer(s) are formed by holes crossing the upper target.

8. The power steering system according to claim 1, wherein the annular support has an outer ring disposed around the inductive sensor and mounted on the reducer casing.

9. The power steering system according to claim 8, wherein the outer ring of the annular support is mounted directly on the reducer casing, or is mounted on a subplate secured to the lower tube and fastened on the reducer casing, or is mounted on a tray of a fastening sleeve fastened on the reducer casing, said fastening sleeve comprising a bushing secured to the tray and inside which the lower tube is fastened.

10. The power steering system according to claim 1, wherein the inductive sensor is overmolded inside the annular support or assembled on the annular support.

11. The power steering system according to claim 1, wherein the worm wheel comprises a core made of a plastic material around the output shaft, and the lower target is secured to an upper lateral face of said core.

12. The power steering system according to claim 11, wherein the core comprises a rim made of a plastic material and a toothed crown made of a plastic material overmolded around the rim, and the lower target is secured to the rim and/or to the crown.

13. The power steering system according to claim 11, wherein the lower target is secured to the upper lateral face of the core by gluing, or by welding, or by clipping, or by snap-crimping, or by overmolding, or by screwing, or by a metal deposition over the upper lateral face by a hot-marking with a metallic film borne by a support film or by a selective metallization of the upper lateral face of the core.

14. The power steering system according to claim 1, wherein the lower target is located at a non-zero minimum distance from the worm wheel measured along the main axis in the use configuration.

15. The power steering system according to claim 14, wherein the lower target has one or several break-off primer(s).

\* \* \* \* \*